(12) United States Patent
Liu et al.

(10) Patent No.: US 8,100,024 B2
(45) Date of Patent: Jan. 24, 2012

(54) EXTERNAL CIRCULATION TYPE BALL SCREW WITH A NOISE-REDUCTION STRUCTURE

(75) Inventors: Jouns Liu, Taichung (TW); Jui-Long Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 230 days.

(21) Appl. No.: 12/549,933

(22) Filed: Aug. 28, 2009

(65) Prior Publication Data
US 2011/0048151 A1 Mar. 3, 2011

(51) Int. Cl.
*F16H 55/02* (2006.01)

(52) U.S. Cl. .................................... 74/424.82

(58) Field of Classification Search .. 74/424.81–424.84, 74/424.86, 424.87; 181/253
See application file for complete search history.

(56) References Cited

U.S. PATENT DOCUMENTS

| | | | |
|---|---|---|---|
| 4,148,226 A * | 4/1979 | Benton | 74/424.87 |
| 4,211,125 A * | 7/1980 | Benton | 74/424.82 |
| 5,303,607 A * | 4/1994 | Katahira | 74/424.87 |
| 5,373,755 A | 12/1994 | Rohlinger | |
| 5,653,145 A | 8/1997 | Kobayashi et al. | |
| 5,974,908 A | 11/1999 | Shirai et al. | |
| 6,454,042 B1 * | 9/2002 | Yoshida et al. | 180/444 |
| 6,668,672 B2 | 12/2003 | Kuo et al. | |
| 7,207,234 B2 * | 4/2007 | Ohkubo et al. | 74/424.83 |
| 7,234,368 B1 * | 6/2007 | Lin et al. | 74/89.44 |
| 7,516,681 B2 * | 4/2009 | Hsu | 74/424.86 |
| 2002/0189897 A1 * | 12/2002 | Trochon | 181/253 |
| 2003/0024336 A1 * | 2/2003 | Ohkubo | 74/424.82 |
| 2005/0087031 A1 * | 4/2005 | Ohkubo et al. | 74/424.85 |
| 2005/0205351 A1 * | 9/2005 | D'Angelo | 181/216 |
| 2006/0248973 A1 * | 11/2006 | Teramachi et al. | 74/424.83 |
| 2007/0000342 A1 * | 1/2007 | Kazuno | 74/424.83 |
| 2008/0121056 A1 * | 5/2008 | Tsou et al. | 74/89.44 |
| 2008/0127764 A1 | 6/2008 | Takahashi et al. | |
| 2009/0013811 A1 * | 1/2009 | Hsu | 74/424.87 |
| 2010/0170359 A1 * | 7/2010 | Chen et al. | 74/424.83 |
| 2011/0048151 A1 * | 3/2011 | Liu et al. | 74/424.86 |

FOREIGN PATENT DOCUMENTS

| | | |
|---|---|---|
| JP | 2002276764 | 9/2002 |
| JP | 2004116688 | 4/2004 |
| JP | 2004156767 | 6/2004 |
| JP | 2005308081 | 11/2005 |
| JP | 2007247720 | 9/2007 |

\* cited by examiner

*Primary Examiner* — Justin Krause
*Assistant Examiner* — Matthew R Vaerewyck

(57) ABSTRACT

An external circulation type ball screw with a noise-reduction structure is provided with a noise-reduction cover to be mounted on the nut. The noise-reduction cover is defined with a noise-reduction groove with two ends to cover impacting portions of the return path of the return member where the rolling elements impact the return path. With the design of the noise-reduction groove, noises will counteract each other after being transmitted to the noise-reduction groove, thus reducing the noises produced by the rolling elements impacting the return member and accordingly reducing the noises produced during operation of the ball screw.

1 Claim, 4 Drawing Sheets

EXTERNAL CIRCULATION TYPE BALL SCREW WITH A NOISE-REDUCTION STRUCTURE

BACKGROUND OF THE INVENTION

1. Field of the Invention

The present invention relates to an external circulation type ball screw, and more particularly to an external circulation type ball screw with a noise-reduction structure.

2. Description of the Prior Art

Referring to FIG. 1, a conventional external circulation type ball screw comprises a screw 11 with a helical groove 111 in its outer surface, a nut 12 with a through hole 121 for passage of the screw 11, a return member 14 with a return path 141, and a plurality of rolling elements 15. The through hole 121 is provided in its inner surface with an inner groove 122 which cooperates with the groove 111 to form a load path 13. The return member 14 is disposed at on outside of the nut 12, the return path 141 is in communication with the load path 13, and the plurality of rolling elements 15 roll within the load path 13 and the return path 141. Such conventional external circulation type ball screw has the following disadvantages that need to be improved:

Since the return member 14 is disposed on the outside of the nut 12, and the noise of the ball screw mostly comes from the rolling elements 15 impacting a corner 141a of the return path 141 and rolling against the inner surface of the return path 141, that is to say that the noise source is exposed to the outside, which will cause a lot of noise.

Some other return members of the ball screws, such as disclosed in U.S. Pat. Nos. 5,373,755, 5,653,145 and US Publication No. 20080127764, are fixed by a covering plate and fasteners to reduce the vibration caused by the rolling elements impacting the return members at high speed. However, the high-frequency noise caused by the rolling elements at the corner of the return path still comes out.

And some other return paths of the ball screws, such as disclosed in U.S. Pat. Nos. 5,974,908, 6,668,672 and JP Pat Nos. 2007247720, 2005308081, 2004156767, 2004116688, and 2002276764, are completely covered by a fixing member, or even interiorly provided with vibration damping material to reduce the high-frequency noise caused by the rolling elements impacting the corner of the return path. However, the fixing member is not designed with any noise-absorbing structure, and the only noise-reduction measure is the wall thickness of the fixing member. The problem is that fixing member cannot be thick enough to provide an ideal sound-proof effect because it is restricted by the outer diameter of the screw.

The present invention has arisen to mitigate and/or obviate the afore-described disadvantages.

SUMMARY OF THE INVENTION

The primary object of the present invention is to provide an external circulation type ball screw with a noise-reduction structure which is capable of reducing the noises caused during the operation of the ball screw.

To achieve the above-mentioned object, an external circulation type ball screw with a noise-reduction structure in accordance with the present invention comprises: a screw with a groove in its outer surface; a nut with a through hole for insertion of the screw, and in an inner surface of the through hole being defined a groove which cooperates with the groove of the screw to form a load path; at least one return member defined with a return path and mounted on the nut, and the return path of the return member being in communication with the load path; a plurality of rolling elements circulating within the load path and the return path; and a noise-reduction cover mounted on the nut and defined with a noise-reduction groove, and a head and an end of the noise-reduction groove being aligned with and covering impacting portions of the return path of the return member where the rolling elements impact the return path.

Furthermore, the noise-reduction cover is further provided with a groove for pressing closely against covering the return member, and the noise-reduction groove is in communication with the groove of the noise-reduction cover.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
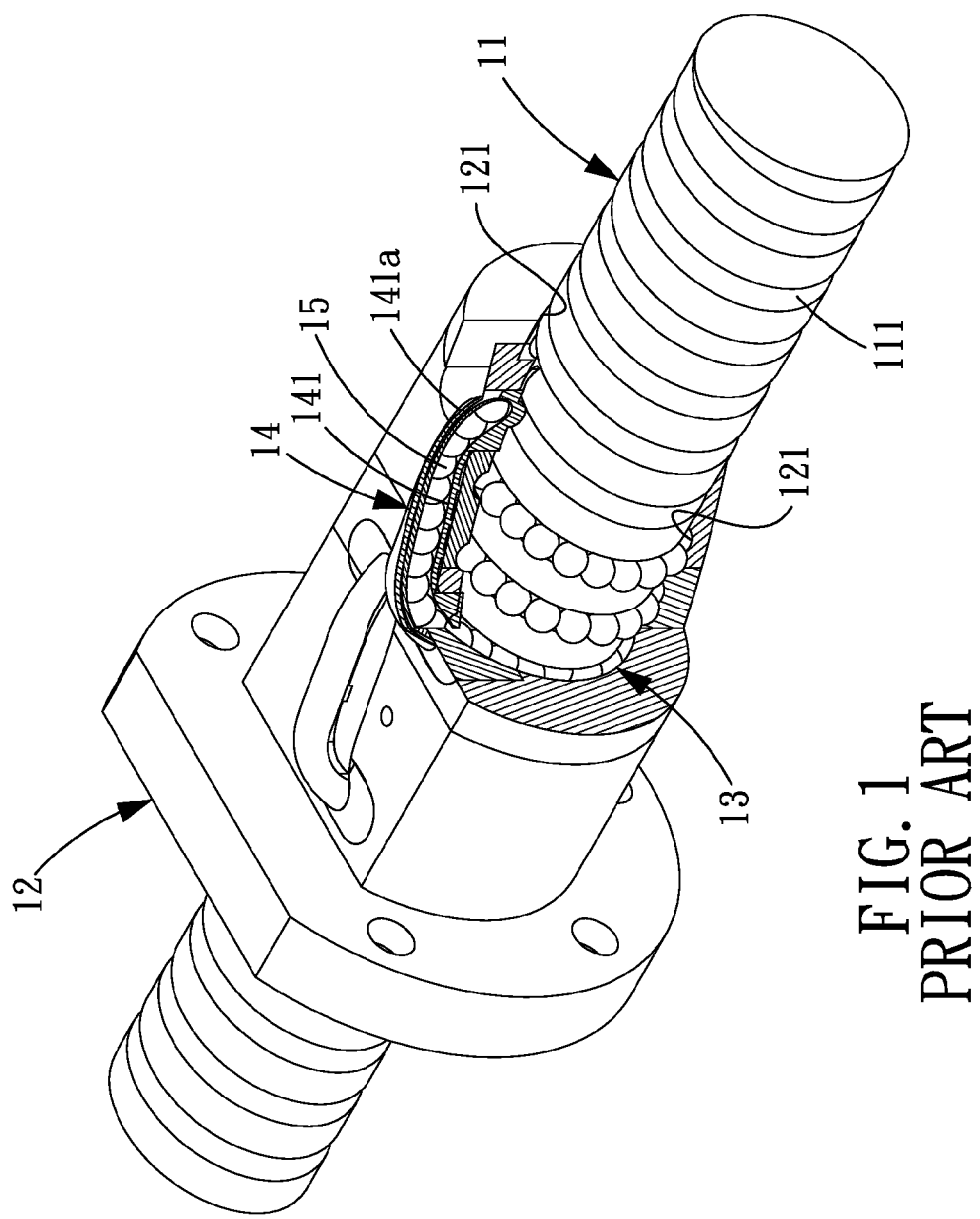
FIG. 1 is a cross sectional view of a conventional external circulation type ball screw.
Figure 2:
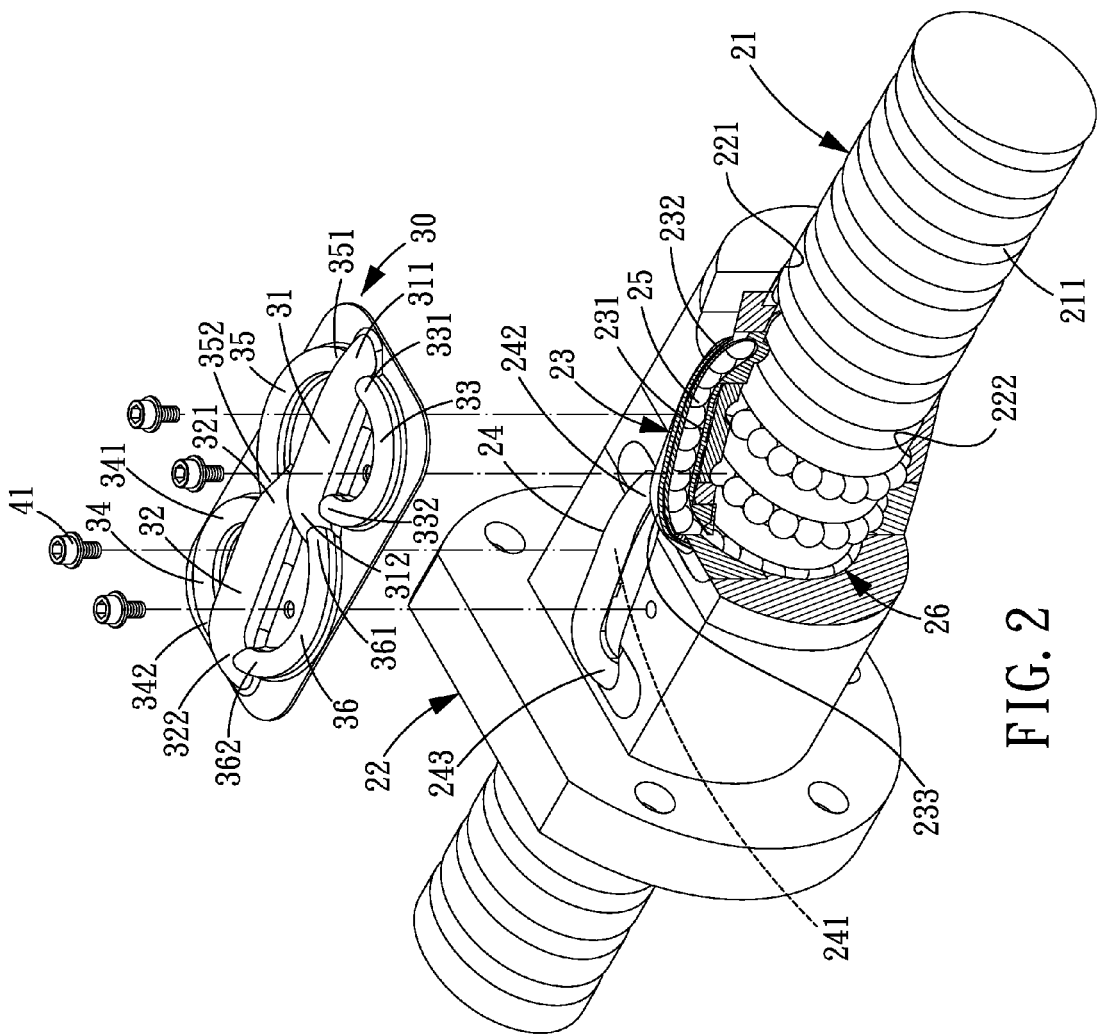
FIG. 2 is an exploded view of an external circulation type ball screw with a noise-reduction structure in accordance with the present invention.
Figure 3:
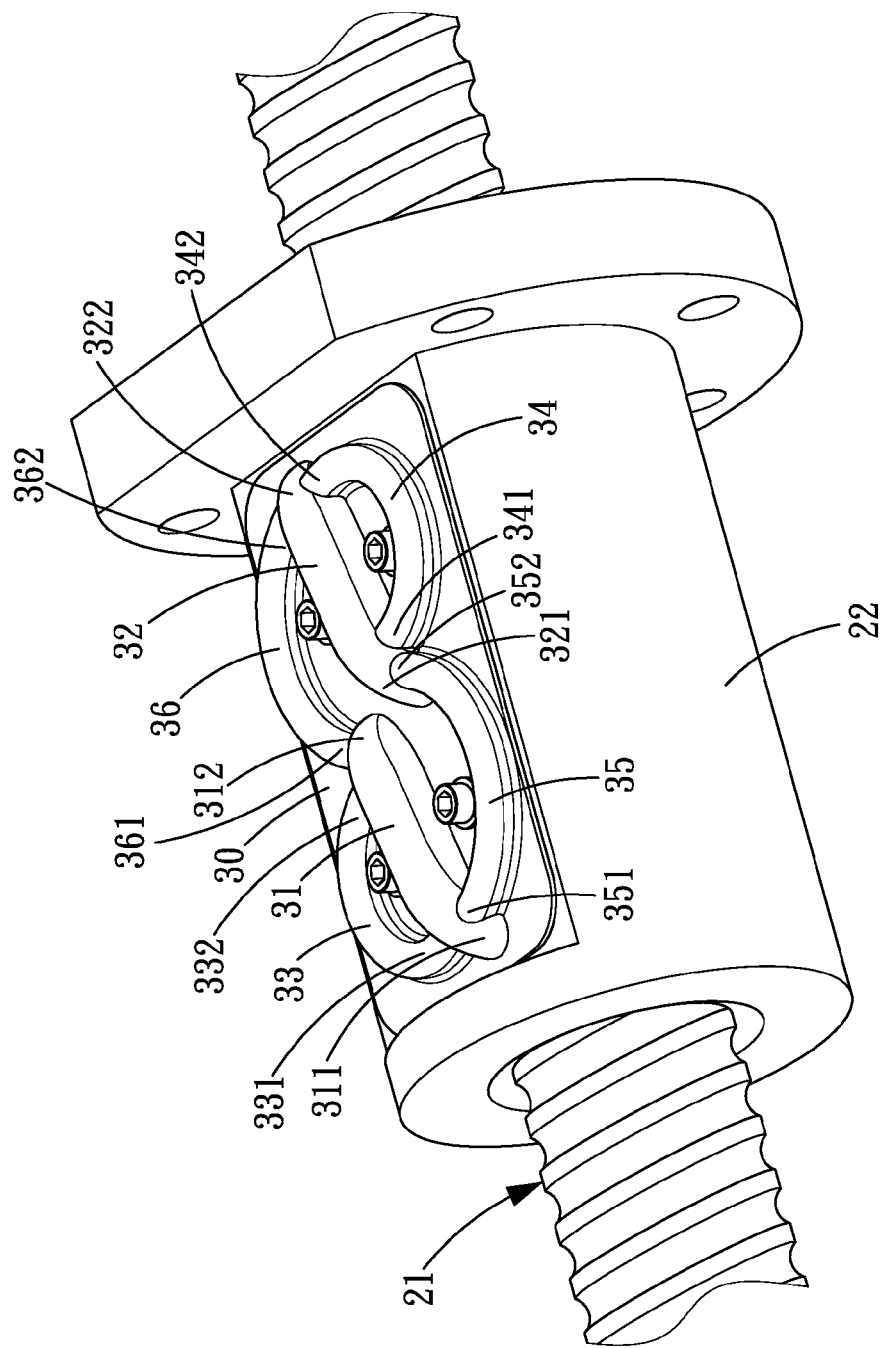
FIG. 3 is an assembly view of the external circulation type ball screw with a noise-reduction structure in accordance with the present invention.

Referring to FIGS. 2 and 3, an external circulation type ball screw with a noise-reduction structure in accordance with a preferred embodiment of the present invention is shown and comprises: a screw 21, a nut 22, a first return member 23, a second return member 24, and a plurality of rolling elements 25. The screw 21 is defined in its outer peripheral surface with a groove 211. The nut 22 is defined with a through hole 221 for insertion of the screw 21, and a groove 222 is defined in the inner surface of the through hole 221 to cooperate with the groove 211 to form load path 26. The first return member 23 is provided with a return path 231 and mounted on the nut 22 in such a manner that the return path 231 is in communication with the load path 26. The second return member 24 is provided with a return path 241 and mounted on the nut 22 in such a manner that the return path 241 is in communication with the load path 26. The rolling elements 25 roll within the load path 26 and the two return paths 231 and 241. The characteristics of the present invention are explained as follows:

A noise-reduction cover 30 is fixed to the outside of the nut 22 by screws 41 and provided with: a first groove 31 with a head 311 and an end 312, a second groove 32 with a head 321 and an end 322, a first noise-reduction groove 33 with a head 331 and an end 332, a second noise-reduction groove 34 with a head 341 and an end 342, a third noise-reduction groove 35 with a head 351 and an end 352, and a fourth noise-reduction groove 36 with a head 361 and an end 362.

The first groove 31 is positioned on and pressed closely against the outer surface of the return path 231 of the first return member 23 in such a manner that the head 311 and end 312 of the first groove 31 are aligned with and cover the impacting portions of the return path 231 of the first return member 23 where the rolling elements 25 impact the return path 231, and the impacting portions are namely two corners 232 and 233 of the first return member 23.

The second groove 32 is positioned on and pressed closely against the outer surface of the return path 241 of the second return member 24 in such a manner that the head 321 and the end 322 of the second groove 32 are aligned with and cover the impacting portions of the return path 241 of the second return member 24 where the rolling elements 25 impact the return path 241, and the impacting portions are namely two corners 242 and 243 of the second return member 24.

The head 331 and end 332 of the first noise-reduction groove 33 are in communication with the head 311 and the end 312 of the first groove 31 and aligned with and cover the impacting portions of the return path 231 of the first return member 23, namely the two corners 232 and 233 of the first return member 23.

The head 341 and the end 342 of the second noise-reduction groove 34 are in communication with the head 321 and the end 322 of the second groove 32 and aligned with and cover the impacting portions of the return path 241 of the second return member 24, namely, the two corners 242 and 243 of the second return member 24.

The head 351 and the end 352 of the third noise-reduction groove 35 are in communication with the heads 311 and 321 of the first and second grooves 31, 32 in such manner that the head 351 and the end 352 of the third noise-reduction groove 35 are aligned with and cover the impacting portions of the first and second return members 23, 24, namely, the corners 232 and 242 of the first and second return members 23, 24.

The head 361 and the end 362 of the fourth noise-reduction groove 36 are in communication with the ends 312 and 322 of the first and second grooves 31, 32 in such a manner that the head 361 and the end 362 of the fourth noise-reduction groove 36 are aligned with and cover the impacting portions of the first and second return members 23, 24, namely, the other corners 233 and 243 of the first and second return members 23 and 24.

Figure 4:
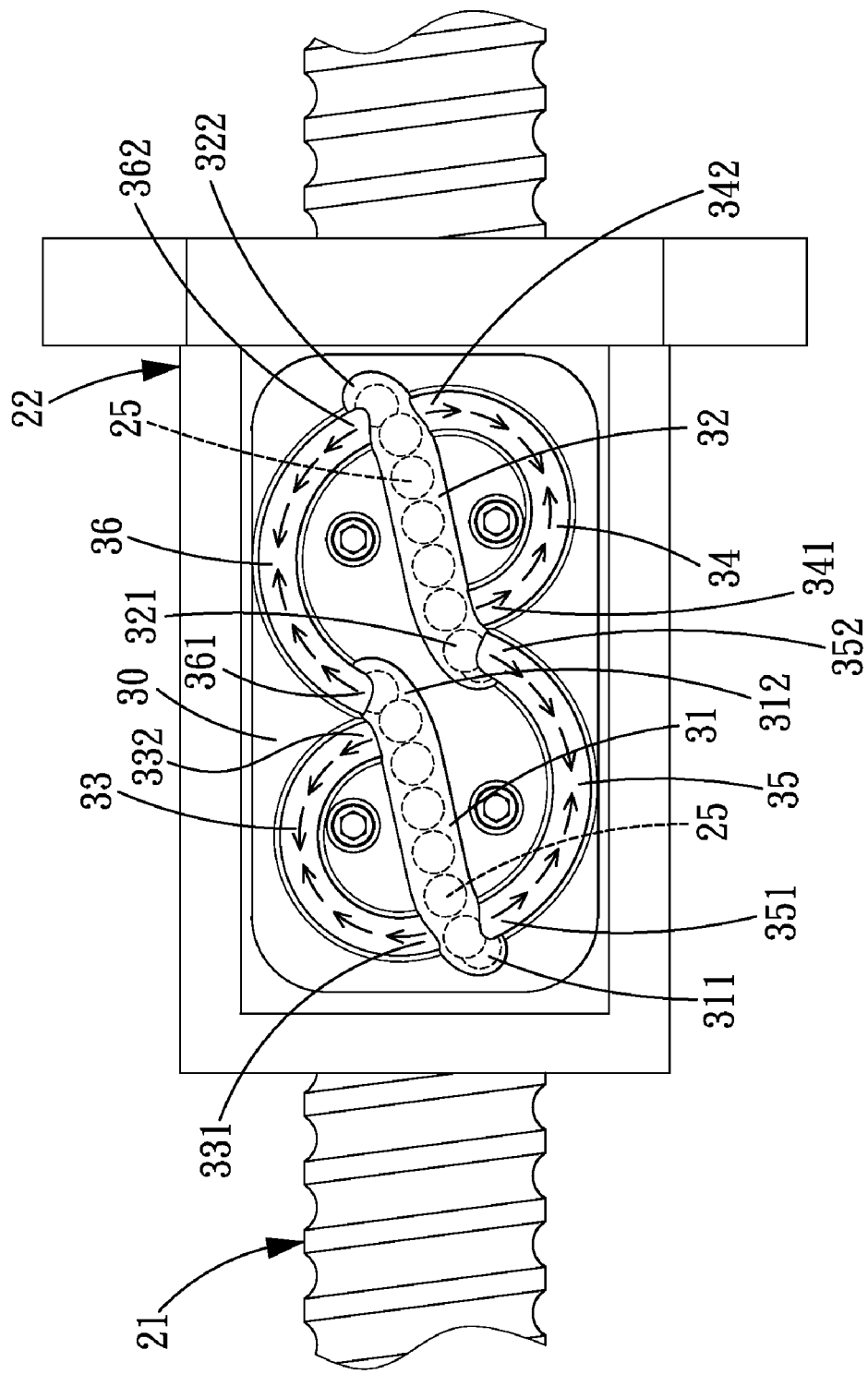
FIG. 4 is an operation view of the external circulation type ball screw with a noise-reduction structure in accordance with the present invention.

For a better understanding of the operation and function of the present invention, reference should be made to FIGS. 2 and 4.

When the external circulation type ball screw is in operation, the rolling elements 25 roll within the return path 231 of the first return member 23 and produce noises in the corners 232 and 233 of the first return member 23, and then the noises are transmitted to the head 311 and the end 312 of the first groove 31 of the noise-reduction cover 30. Since the head 311 and the end 312 of the first groove 31 are in communication with the first noise-reduction groove 33, the noises as indicated by the arrows will come into the head 331 and the end 332 of the first noise-reduction groove 33 simultaneously. When the noises meet in the first noise-reduction groove 33, a destructive interference is produced to effectively reduce the noises. Similarly, the second noise-reduction groove 34 which is in communication with the head 321 and the end 322 of the second groove 32 can reduce the noises produced by the rolling elements 25 in the corners 242 and 243 of the second return member 24.

Furthermore, when the external circulation type ball screw is in operation, the rolling elements 25 produce noises at the corners 232, 233, 242 and 243 of the first and second return members 23, 24, and then the noises are transmitted to the heads 311 and 321 and the ends 312 and 322 of the first and second grooves 31, 32. Since between the heads 311, 321 of the first and second grooves 31, 32 is connected the third noise-reduction groove 35, and between the ends 312, 322 of the first and second grooves 31, 32 is connected the fourth noise-reduction groove 36, the noises will come into the heads 351, 361 and the ends 352, 362 of the third and fourth noise-reduction grooves 35 and 36 simultaneously. When the noises meet in the third and fourth noise-reduction grooves 35 and 36, a destructive interference is produced to effectively reduce the noises.

In addition to the design that the return members are fully covered by the noise-reduction cover so as to reduce the noises caused by the rolling elements impacting the return members, the noise-reduction cover is further designed to have noise-reduction grooves so that the noises will counteract each other after being transmitted to the respective noise-reduction grooves, thus further reducing the noises.

While we have shown and described various embodiments in accordance with the present invention, it is clear to those skilled in the art that further embodiments may be made without departing from the scope of the present invention.

What is claimed is:

1. An external circulation type ball screw with a noise-reduction structure comprising:
   a screw with a groove in its outer surface;
   a nut with a through hole for insertion of the screw, and in an inner surface of the through hole being defined a groove which cooperates with the groove of the screw to forth a road path;
   at least one return member defined with a return path and mounted on the nut, and the return path of the return member, being in communication with the load path;
   a plurality of rolling elements circulating within the load path and the return path; and
   a noise-reduction cover mounted on the nut and defined with at least one groove positioned on and pressed against an outer surface of the return member, and at least one noise-reduction groove in communication with the groove of the noise-reduction cover, and a head and an end of the noise-reduction groove being aligned with and covering impacting portions of the return path of the return member where the rolling elements impact the return path;
   a first and a second return members are mounted on the nut, the noise-reduction cover is provided with a first groove positioned on and pressed against an outer surface of the first return member, a second groove positioned on and pressed against an outer surface of the second return member, a first noise-reduction groove connected between a head and an end of the first groove, a second noise-reduction groove connected between a head and an end of the second groove, a third noise-reduction groove connected between the heads of the first and second grooves, and a fourth noise-reduction groove connected between the ends of the first and second grooves.

* * * * *